United States Patent [19]
Schütze et al.

[11] Patent Number: 5,944,887
[45] Date of Patent: Aug. 31, 1999

[54] TRANSFORMATION OF CRUDE HALOGENATED COPPER PHTHALOCYANINE PIGMENTS INTO A USEFUL PIGMENTARY STATE

[75] Inventors: Andrea Birgit Schütze, Hamburg; Frank Scherhag, Stuttgart-Feuerbach; Peter Böttcher, Carlsberg, all of Germany

[73] Assignee: BASF Aktiengesellschaft, Ludwigshafen, Germany

[21] Appl. No.: 09/169,988

[22] Filed: Oct. 13, 1998

[30] Foreign Application Priority Data

Oct. 17, 1997 [DE] Germany ............ 197 45 922

[51] Int. Cl.$^6$ ............ C09B 47/08; C09B 47/04
[52] U.S. Cl. ............ 106/411; 106/410; 106/412; 106/413; 540/140; 540/141
[58] Field of Search ............ 106/410, 411, 106/412, 413; 540/140, 141

[56] References Cited

U.S. PATENT DOCUMENTS

| | | | |
|---|---|---|---|
| 2,930,796 | 3/1960 | Katz et al. | 106/412 |
| 3,353,977 | 11/1967 | Kranz et al. | 106/410 |
| 3,730,750 | 5/1973 | Fabian | 106/410 |
| 4,051,146 | 9/1977 | Wessling | 540/137 |
| 4,069,064 | 1/1978 | Nett et al. | 106/413 |
| 4,205,995 | 6/1980 | Wheeler et al. | 106/287.21 |
| 4,256,507 | 3/1981 | Kranz et al. | 106/495 |
| 4,680,387 | 7/1987 | Kranz | 540/136 |
| 4,694,078 | 9/1987 | Langley et al. | 540/141 |
| 4,789,739 | 12/1988 | Kranz et al. | 540/137 |
| 4,801,638 | 1/1989 | Langley et al. | 106/412 |
| 5,223,027 | 6/1993 | Nonaka et al. | 106/412 |
| 5,264,032 | 11/1993 | Dietz et al. | 106/411 |
| 5,759,254 | 6/1998 | MacPherson et al. | 106/413 |
| 5,772,750 | 6/1998 | Tomiya et al. | 106/412 |

FOREIGN PATENT DOCUMENTS

| | | |
|---|---|---|
| 58 888 | 9/1982 | European Pat. Off. . |
| 0 182 207 | 5/1986 | European Pat. Off. . |
| 0 209 487 | 1/1987 | European Pat. Off. . |
| 209487 | 1/1987 | European Pat. Off. ............ 106/412 |
| 0 535 774 | 4/1993 | European Pat. Off. . |
| 0 538 784 | 4/1993 | European Pat. Off. . |
| 0 761 770 | 3/1997 | European Pat. Off. . |
| 1 242 180 | 6/1967 | Germany . |
| 20 13 818 | 10/1971 | Germany . |
| 24 49 231 | 4/1976 | Germany . |
| 25 16 054 | 10/1976 | Germany . |
| 25 19 753 | 11/1976 | Germany . |
| 27 53 008 | 6/1978 | Germany . |
| 29 05 114 | 7/1980 | Germany . |
| 36 36 428 | 5/1988 | Germany . |
| 6-336556 | 12/1994 | Japan . |
| 1088736 | 8/1965 | United Kingdom . |
| 1 544 839 | 4/1979 | United Kingdom . |

OTHER PUBLICATIONS

Derwent Publications Ltd., London, GB; XP002089066 "Poly–(halo–copper phthalocyanine) pigment preparation" (Abstract) of Japanese Patent Specification No. 63–36556 (Dec. 1994).

Longman Group UK Limited, Essex, England; Heterocyclic Chemistry, 1985, pp. 10–11. [No Month].

*Primary Examiner*—Anthony Green
*Attorney, Agent, or Firm*—Oblon, Spivak, McClelland, Maier & Neustadt, P.C.

[57] ABSTRACT

A process for transforming crude halogenated copper phthalocyanine pigments having a chlorine content of from 4 to 50.3% by weight into a useful pigmentary state comprises treating the crude pigment at elevated temperature with a liquid acidic aromatic organic medium in the presence of a copper phthalocyanine derivative selected from the group consisting of the copper phthalocyanine-sulfonic and -carboxylic acids and their alkali metal, ammonium and alkylammonium salts, the amino-substituted and aminomethylated copper phthalocyanines and their reaction products with alkylating agents, sulfonic acids, sulfonyl chlorides and carbonyl chlorides, the imidomethylene- and amidomethylene-substituted copper phthalocyanines, the alkyl-, aryl- and cyano-substituted copper phthalocyanines and the hydroxyl- and alkoxy-substituted copper phthalocyanines, if desired in the presence of water.

21 Claims, No Drawings

TRANSFORMATION OF CRUDE HALOGENATED COPPER PHTHALOCYANINE PIGMENTS INTO A USEFUL PIGMENTARY STATE

The present invention relates to a novel process for transforming crude halogenated copper phthalocyanine pigments having a chlorine content of from 4 to 50.3% by weight into a useful pigmentary state.

The halogenation of copper phthalocyanine customarily produces amorphous to microcrystalline products which, owing to their pronounced tendency to agglomerate, have no utility for pigment applications.

Various methods are known to transform crude pigments into a useful pigmentary state, for example mechanical comminution or treatment with concentrated sulfuric acid or with organic solvents at elevated temperature.

The solvents used for treating polyhalogenated copper phthalocyanines are mainly xylene (DE-A-20 13 818), trichlorobenzene, chloronaphthalene or nitrobenzene (DE-A-24 49 231), 2-nitrophenol (DE-A-12 42 180), naphthol (GB-A-1 088 736), benzoic acid and/or alkylbenzoic acids (EP-A-58 888) or aliphatic ketones (DE-A 36 36 428) in the presence or absence of water. JP-A 336 556/1994 describes a process wherein polyhalogenated copper phthalocyanines are heated in mixtures of water and aromatic solvents in the presence of copper phthalocyanine derivatives; acidic solvents are not used.

These known processes frequently provide only unsatisfactory results and, what is more, are limited to copper phthalocyanines having a high degree of halogenation (chlorine content $\geq 38.5\%$ by weight, ie. at least 10 chlorine atoms on the CuPc structure).

It is an object of the present invention to provide a process whereby not just polyhalogenated, but especially also crude incipiently halogenated (chlorine content <38.5% by weight, for example) copper phthalocyanine pigments can be transformed in a technically simple, economical manner into coloristically valuable pigmentary forms and which makes it possible to prepare optimized pigments for a particular application.

We have found that this object is achieved by a process for transforming crude halogenated copper phthalocyanine pigments having a chlorine content of from 4 to 50.3% by weight into a useful pigmentary state, which comprises treating the crude pigment at elevated temperature with a liquid acidic aromatic organic medium in the presence of a copper phthalocyanine derivative selected from the group consisting of the copper phthalocyanine-sulfonic and -carboxylic acids and their alkali metal, ammonium and alkylammonium salts, the amino-substituted and aminomethylated copper phthalocyanines and their reaction products with alkylating agents, sulfonic acids, sulfonyl chlorides and carbonyl chlorides, the imidomethylene- and amidomethylene-substituted copper phthalocyanines, the alkyl-, aryl- and cyano-substituted copper phthalocyanines and the hydroxyl- and alkoxy-substituted copper phthalocyanines, if desired in the presence of water.

The organic medium used is preferably a compound of the general formula I

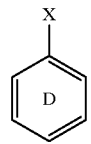

where X is hydroxyl or carboxyl and the benzene ring D may additionally bear up to two identical or different substituents selected from the group consisting of nitro, $C_1$–$C_4$-alkyl, preferably $C_1$–$C_2$-alkyl, $C_2$–$C_4$-alkenyl, preferably $C_2$–$C_3$-alkenyl, chlorine and bromine and may be benzofused.

When X is carboxyl ("solvent" based on benzoic acid), the benzene ring D is preferably substituted by an additional $C_1$–$C_4$-alkyl, especially $C_1$–$C_2$-alkyl, group or particularly preferably unsubstituted.

When X is hydroxyl (phenolic "solvent"), the benzene ring D preferably bears one of the aforementioned substituents in addition; if the benzene ring D is benzofused, it preferably bears no further substituents.

The organic medium should have little, if any, solubility in water at room temperature and should be liquid at the process temperature. The melting point of said compounds I should therefore generally be $\leq 200°$ C., preferably $\leq 150°$ C.

Examples of suitable acidic aromatic organic media are: benzoic acid, 2-, 3- and 4-methylbenzoic acid, 2-, 3- and 4-ethylbenzoic acid, phenol, 2-, 3- and 4-nitrophenol, 2-, 3- and 4-methylphenol (-cresol), 2-, 3- and 4-ethylphenol, 2-allylphenol, 2-, 3- and 4-bromophenol, 2,4-dibromophenol, 2,4-dichlorophenol, 2-chloro-6-nitrophenol, 2-chloro-4-nitrophenol, 2,4-dinitrophenol, 3-methyl-4-nitrophenol, 1- and 2-naphthol and 1-bromo-2-naphthol and mixtures thereof, of which 3- and 4-nitrophenol and 1- and 2-naphthol are preferred and 2-nitrophenol is particularly preferred.

The amount of organic medium used per g of crude copper phthalocyanine pigment is generally within the range from 1 to 20 g, preferably within the range from 1 to 6 g.

The pigment treatment of the present invention can be carried out both in the absence and in the presence of water. That is, the crude halogenated copper phthalocyanine pigment can be used in dried form or else advantageously directly in the form of the as-halogenated, water-moist (water content customarily within the range of from 50 to 90% by weight) filter press cake.

The amount of water in the pigment treatment of the present invention is not critical, but excessively large quantities of water should be avoided so as not to lower the space-time yields unnecessarily.

The pigment treatment of the present invention is carried out in the presence of one of the aforementioned copper phthalocyanine derivatives, including, of course, mixtures of the derivatives.

The copper phthalocyanine derivatives serve both to control crystal growth during recrystallization and to modify the surface of the resulting pigment. Their choice depends on the degree of chlorination of the crude pigment, the property profile desired for the recrystallized pigment and the later application medium.

Preference is given to copper phthalocyanine derivatives of the general formula II

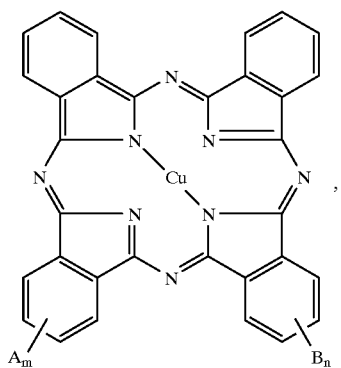

II where:
A and B are independently of each other the following substituents:
—SO$_3$M, —CO$_2$M, —SO$_3$H.HNR$^1$R$^2$, —CH$_2$NR$^3$R$^4$, —NR$^3$R$^4$, —CH$_2$NR$^3$R$^4$.HO$_3$SR$^5$, —NR$^3$R$^4$.HO$_3$SR$^5$, —NHCOR$^1$, —CH$_2$NHCOR$^1$, —NHSO$_2$R$^1$, —CH$_2$NHSO$_2$R$^1$, —SO$_2$NHR$^1$, —CONHR$^1$, C$_1$–C$_6$-alkyl, aryl, cyano or —OR$^6$, where R$^1$ and R$^2$ are each independently of the other hydrogen or C$_2$–C$_{20}$-alkenyl or C$_1$–C$_{20}$-alkyl which may be substituted by —NR$^7$R$^8$, where R$^7$ and R$^8$ are each independently of the other C$_1$–C$_{20}$-alkyl, C$_5$–C$_8$-cycloalkyl, which may contain one or more hetero atoms, or hydrogen, R$^3$ and R$^4$ are each independently of the other hydrogen, C$_1$–C$_{20}$-alkyl, C$_2$–C$_{20}$-alkenyl or aryl or combine with the nitrogen atom to form a 5- or 6-membered ring which optionally contains further hetero atoms or carbonyl or sulfonyl groups and may be benzofused, R$^5$ is p-(C$_{10}$–C$_{20}$-alkyl)phenyl or C$_2$–C$_{20}$-alkenyl, R$^6$ is hydrogen or C$_1$–C$_6$-alkyl, and M is hydrogen or an alkali metal, m is an integer or fraction >0 to 4.0, n is an integer or fraction from 0 to 4.0.

Particular preference is given to copper phthalocyanine derivatives of the formula II where the variables have the following meanings:

A and B are independently of each other the following substituents:
—SO$_3$M, —SO$_3$H.HNR$^1$R$^2$, —CH$_2$NR$^3$R$^4$, —CH$_2$NR$^3$R$^4$.HO$_3$SR$^5$ or —SO$_2$NHR$^1$, where R$^1$ and R$^2$ are each independently of the other C$_1$–C$_{20}$-alkyl or hydrogen, R$^3$ and R$^4$ are each independently of the other C$_1$–C$_6$-alkyl or hydrogen or combine with the nitrogen atom to form a carbonyl- or sulfonyl-containing benzofused 5-membered ring, R$^5$ is p-(C$_{10}$–C$_{20}$-alkyl)phenyl, m is an integer or fraction >0 to 4, n is an integer or fraction from 0 to 4, subject to the proviso that the sum m+n is from 0.1 to 4, especially from 1.0 to 3.5.

Specific examples of the radicals A and B in the formula II, and of their substituents, are:

straight-chain or branched C$_1$–C$_{20}$-alkyl radicals such as methyl, ethyl, propyl, isopropyl, butyl, isobutyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the designations isooctyl, isononyl, isodecyl and isotridecyl are trivial designations derived from the alcohols obtained by the oxo process—cf. Ullmann's Encyklopädie der technischen Chemie, 4th edition, volume 7, pages 215 to 217, and also volume 11, pages 435 and 436);

straight-chain or branched C$_2$–C$_{20}$-alkenyl radicals such as ethenyl, propenyl, isopropenyl, butenyl, isobutenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl and eicosenyl;

straight-chain or branched C$_1$–C$_6$-alkoxy radicals such as methoxy, ethoxy, propoxy, isopropoxy, butoxy, isobutoxy, tert-butoxy, pentoxy, isopentoxy, neopentoxy, tert-pentoxy and hexoxy;

C$_5$–C$_8$-cycloalkyl radicals which can contain hetero atoms such as oxygen and/or nitrogen as replacement for one or more carbon atoms, but are not attached via these, such as cyclopentyl, cyclohexyl, cycloheptyl, cyclooctyl, tetrahydrofuryl, pyrrolidyl, piperidyl, piperazyl and morpholinyl;

aryl radicals such as naphthyl and especially phenyl;

p-(C$_{10}$–C$_{20}$-alkyl)phenyl radicals such as p-decyl-, p-undecyl-, especially p-dodecyl-, also p-tridecyl-, p-tetradecyl-, p-pentadecyl-, p-hexadecyl-, p-heptadecyl-, p-octadecyl-, p-nonadecyl- and p-eicosyl-phenyl;

carboxyl, preferably sulfo and mono(C$_{10}$–C$_{20}$-alkyl) ammonium sulfonate radicals such as monodecyl-, monoundecyl-, monododecyl-, monotridecyl-, monotetradecyl-, monopentadecyl-, especially monohexadecyl-, also monoheptadecyl-, monooctadecyl-, mononondecyl- and monoeicosyl-ammonium sulfonate radicals;

mono- and di(C$_1$–C$_6$-alkyl)amino radicals such as mono- and dimethylamino, mono- and especially diethylamino, mono- and dipropylamino, mono- and diisopropylamino, mono- and dibutylamino, mono- and diisobutylamino, mono- and dipentylamino and mono- and dihexylamino and also especially mono- and preferably di(C$_1$–C$_6$-alkyl)aminomethyl radicals in which the amino radicals mentioned are attached to the phthalocyanine structure via a methylene group;

reaction products of mono- and di(C$_1$–C$_6$-alkyl)amino radicals and preferably of the corresponding aminomethyl radicals with C$_{10}$–C$_{20}$-alkylphenylsulfonic acids such as p-decyl-, p-undecyl-, especially p-dodecyl-, also p-tridecyl-, p-tetradecyl-, p-pentadecyl-, p-hexadecyl-, p-heptadecyl-, p-octadecyl-, p-nonadecyl- and p-eicosyl-phenylsulfonic acids, the alkyl radicals being disposed ortho, meta or preferably para to the sulfonic acid group, eg. —CH$_2$—N(C$_2$H$_5$)$_2$.HO$_3$S—Ph-4-C$_{12}$H$_{25}$ and —CH$_2$—NH(C$_2$H$_5$).HO$_3$S—Ph-4-C$_{12}$H$_{25}$;

heterocycloalkyl and hetaryl radicals containing the amine nitrogen atom and attached therethrough, such as 4-morpholinyl, pyrrolidyl, piperidyl, piperazyl, pyrazolyl, pyrryl, pyrazyl, imidazyl, especially N-phthalimidyl and N-saccharinyl and also preferably the corresponding radicals attached to the phthalocyanine structure via —CH$_2$—;

mono($C_1$–$C_{20}$-alkylcarbonyl)amino radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl-, 2-monomethylpentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, mononadecyl- and monoeicosyl-carbonylamino and also the corresponding amino radicals attached to the phthalocyanine structure via —$CH_2$—;

mono($C_1$–$C_{20}$-alkylsulfonyl)amino radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl-, 2-monomethylpentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, mononadecyl- and monoeicosyl-sulfonylamino and also the corresponding amino radicals attached to the phthalocyanine structure via —$CH_2$—;

mono($C_1$–$C_{20}$-alkylamino)sulfonyl radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl-, 2-monomethylpentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, mononadecyl- and monoeicosyl-aminosulfonyl, it being possible for the alkyl radicals to bear a terminal amino, mono- or di($C_1$–$C_6$-alkyl)amino group;

mono($C_1$–$C_{20}$-alkylamino)carbonyl radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl-, 2-monomethylpentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, mononadecyl- and monoeicosyl-aminocarbonyl, it being possible for the alkyl radicals to bear a terminal amino, mono- or di($C_1$–$C_6$-alkyl) amino group.

The phthalocyanine derivatives II are known per se and are preparable according to known methods (eg. EP-A-535 774, DE-A-25 16 054, EP-A-538 784 and DE-A-29 05 114).

The copper phthalocyanine derivative II is used in the process of the present invention in an amount which is generally within the range from 0.1 to 20% by weight, preferably within the range from 1 to 10% by weight, each percentage being based on the crude copper phthalocyanine pigment.

Suitable process temperatures are generally within the range from 80 to 200° C., preferably within the range from 80 to 120° C., the temperature also having to be conformed in each case to the melting point of the acidic aromatic organic medium.

In the presence of water, the pigment treatment of the present invention is carried out preferably at >100° C. in a sealed reactor under autogenous pressure.

The pigment treatment customarily takes from 2 to 10 h, especially from 2 to 5 h. The higher the selected temperature, the faster the recrystallization.

The process of the present invention is advantageously carried out at follows:

A mixture of crude halogenated copper phthalocyanine pigment, which is preferably present as a water-moist filter cake, copper phthalocyanine derivative and acidic aromatic organic medium is heated to the desired temperature and stirred at that temperature for from 2 to 10 h. To isolate the pigment, aqueous base (eg. from 2 to 60% strength by weight alkali metal hydroxide solution) is added at from 50 to 100° C. in at least the amount which is stoichiometrically required to convert the organic medium into its water-soluble alkali metal salt. The pigment is subsequently filtered off, washed with water and dried.

The organic medium can be reprecipitated by acidification of the alkali metal salt solution using mineral acid and cooling at room temperature and reused for a pigment treatment.

The process of the present invention provides an advantageous way to obtain brilliant, transparent and strong halogenated (both incipiently halogenated and polyhalogenated) copper hthalocyanine pigments having excellent Theological properties, suitable for use in both conventional and waterborne coating systems.

EXAMPLES

A mixture of 50 g (reckoned 100%) of a crude halogenated copper phthalocyanine pigment having a chlorine content of $x_1$% by weight (used in the form of an aqueous press cake having a water content of $x_2$% by weight), 2.5 g of copper phthalocyanine derivative II'

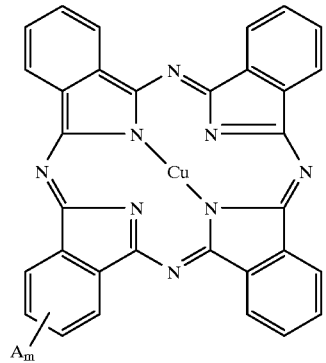

II' and 100 g of organic medium III was heated to 100° C. and stirred at that temperature for 5 h.

After cooling to 80° C., 290 g of 31% strength by weight sodium hydroxide solution were added. The pigment was filtered off, washed with water and dried at 100° C.

Further details concerning these experiments and their results are summarized in the following table:

TABLE

| | Crude pigment | | | | Treated pigment | |
|---|---|---|---|---|---|---|
| Ex. | $x_1$ % by weight of chlorine | $x_2$ % of weight of water | CuPc derivative II | Organic medium III | Yield [g] | Coloristic properties |
| 1 | 5.1 | 80.3 | A = —CH$_2$NH(C$_2$H$_5$); m = 2 | 2-nitrophenyl | 52.5 | stronger, more brilliant, softer in texture than C1 |
| 2 | 5.1 | 80.3 | A = —CH$_2$NH(C$_2$H$_5$).HO$_3$S-Ph-4-C$_{12}$H$_{25}$; m = 2 | 2-nitrophenol | 52.0 | stronger, more brilliant, softer in texture than C1 |
| C1 | 5.1 | 80.3 | — | 2-nitrophenol | 48.7 | |
| 3 | 15.6 | 68.0 | A = —SO$_3$H; m = 1.3 | 2-nitrophenol | 52.9 | stronger, more brilliant, more transparent than C2 |
| 4 | 15.6 | 68.0 | A = —CH$_2$N-phthalimidyl; m = 3 | 2-nitrophenol | 51.2 | stronger, more brilliant, more transparent than C2 |
| C2 | 15.6 | 68.0 | — | 2-nitrophenol | 49.2 | |
| 5 | 15.6 | 68.0 | A = —SO$_3$H; m = 1.3 | 1-naphthol | 52.1 | stronger, more brilliant, more transparent than C3 |
| C3 | 15.6 | 68.0 | — | 1-naphthol | 49.7 | |
| 6 | 38.7 | 80.0 | A = —SO$_3$H; m = 1.3 | 2-nitrophenol | 48.5 | stronger, more brilliant, than C4 |
| 7 | 38.7 | 80.0 | A = —CH$_2$NH(C$_2$H$_5$).HO$_3$S-Ph-4-C$_2$H$_{15}$; m = 2 | 2-nitrophenyl | 50.5 | :stronge,r more brilliant than C4 |
| C4 | 38.7 | 80.0 | — | 2-nitrophenol | 46.5 | |

We claim:

1. A process for improving the pigmentary properties of a crude halogenated copper phthalocyanine pigment having a chlorine content of from 4 to 50.3% by weight, comprising:
    heating the crude pigment with a copper phthalocyanine derivative in a liquid medium comprising an organic compound,
    wherein
        the organic compound contains an acidic functional group,
        the organic compound can be converted into a water-soluble salt by treatment with an aqueous base, and
        the copper phthalocyanine derivative is selected from the group consisting of:
            (1) copper phthalocyanine-sulfonic acids,
            (2) copper phthalocyanine carboxylic acids,
            (3) alkali metal, ammonium and alkylammonium salts of copper phthalocyanine-sulfonic acids,
            (4) alkali metal, ammonium and alkylammonium salts of copper phthalocyanine carboxylic acids,
            (5) amino-substituted and aminomethylated copper phthalocyanines,
            (6) reaction products of amino-substituted and aminomethylated copper phthalocyanines with alkylating agents, sulfonic acids, sulfonyl chlorides or carbonyl chlorides,
            (7) imidomethylene- and amidomethylene-substituted copper phthalocyanines,
            (8) alkyl-, aryl- and cyano-substituted copper phthalocyanines, and
            (9) hydroxyl- and alkoxy-substituted copper phthalocyanines.

2. The process of claim 1, wherein crude pigment contains water.

3. The process of claim 2, wherein the crude pigment contains from 50 to 90% by weight water.

4. The process of claim 1, wherein said heating is conducted at 80 to 200° C.

5. The process of claim 1, wherein said heating is conducted at 80 to 120° C.

6. The process of claim 1, wherein the organic compound is represented by formula I:

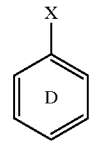

where X is hydroxyl or carboxyl and the benzene ring D may additionally have up to two identical or different substituents selected from the group consisting of nitro, $C_1$–$C_4$-alkyl, $C_2$–$C_4$-alkenyl, chlorine and bromine, and wherein said substituents are optionally benzofused.

7. The process of claim 1, wherein the organic compound is 2-nitrophenol, 3-nitrophenol, 4-nitrophenol, 1-naphthol, 2-naphthol, or a mixture thereof.

8. The process of claim 1, wherein the copper phthalocyanine derivative is represented by formula II:

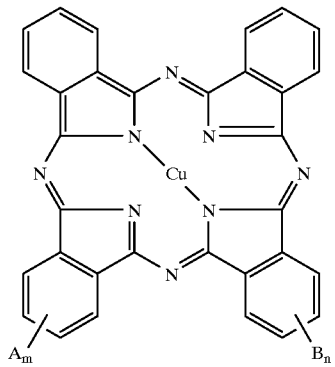

wherein
A and B are each, independently,—SO$_3$M, —CO$_2$M, —SO$_3$H.HNR$^1$R$^2$, —CH$_2$NR$^3$R$^4$, —NR$^3$R$^4$, —CH$_2$NR$^3$R$^4$.HO$_3$SR$^5$,—NR$^3$R$^4$.HO$_3$SR$^5$, —NHCOR$^1$, —CH$_2$NHCOR$^1$, —NHSO$_2$R$^1$, —CH₂NHSO₂R¹, —SO₂NHR¹, —CONHR¹, $C_1$–$C_6$-alkyl, aryl, cyano or —OR⁶, R¹ and R² are each, independently, hydrogen or $C_1$–$C_{20}$-alkenyl or $C_1$–$C_{20}$-alkyl which is optionally substituted by —NR⁷R⁸, R⁷ and R⁸ are each, independently, $C_1$–$C_{20}$-alkyl, $C_5$–$C_8$-cycloalkyl, which may optionally contain one or more hetero atoms, or hydrogen, R³ and R⁴ are each, independently, hydrogen, $C_1$–$C_{20}$-alkyl, $C_2$–$C_{20}$-alkenyl or aryl or combine with the nitrogen atom to form a 5- or 6-membered ring which optionally contains further hetero atoms or carbonyl or sulfonyl groups and may optionally be benzofused, R⁵ is p-($C_{10}$–$C_{20}$-alkyl)phenyl or $C_2$–$C_{20}$-alkenyl, R⁶ is hydrogen or $C_1$–$C_6$-alkyl, and M is hydrogen or an alkali metal, m is an integer or fraction >0 to 4.0, n is an integer or fraction from 0 to 4.0.

9. The process of claim 8, wherein

A and B are each, independently, —SO₃M, —SO₃H.HNR¹R², —CH₂NR³R⁴, —CH₂NR³R⁴.HO₃SR⁵ or —SO₂NHR¹, R¹ and R² are each, independently, $C_1$–$C_{20}$-alkyl or hydrogen, R³ and R⁴ are each, independently, $C_1$–$C_6$-alkyl or hydrogen or combine with the nitrogen atom to form a carbonyl- or sulfonyl-containing benzofused 5-membered ring, R⁵ is p-($C_{10}$–$C_{20}$-alkyl)phenyl, m is an integer or fraction >0 to 4, n is an integer or fraction from 0 to 4, with the proviso that the sum m+n is from 0.1 to 4.

10. The process of claim 1, wherein the crude pigment is treated with from 0.1 to 20% by weight of the copper phthalocyanine derivative, based on the weight of the crude pigment.

11. The process of claim 2, wherein said heating is conducted at >100° C.

12. The process of claim 1, wherein the organic compound is benzoic acid, 2-, 3-, or 4-methylbenzoic acid, 2-, 3-, or 4-ethylbenzoic acid, phenol, 2-, 3-, or 4-nitrophenol, 2-, 3-, or 4-methylphenol, 2-, 3-, or 4-ethylphenol, 2-allylphenol, 2-, 3-, or 4-bromophenol, 2,4-dibromophenol, 2,4-dichlorophenol, 2-chloro-6-nitrophenol, 2-chloro-4-nitrophenol, 2,4-dinitrophenol, 3-methyl-4-nitrophenol, 1- or 2-naphthol, or 1-bromo-2-naphthol.

13. The process of claim 1, wherein the organic compound has a melting point of ≦200° C.

14. The process of claim 1, wherein the organic compound has a melting point of ≦150° C.

15. The process of claim 1, further comprising:

adding an aqueous base to the medium in an amount at least sufficient to stoichiometrically convert the organic compound into a water-soluble salt, followed by isolating the pigment.

16. The process of claim 15, wherein the pigment, after said heating, is isolated by filtration.

17. The process of claim 16, wherein the base is an alkali metal hydroxide.

18. The process of claim 17, wherein the aqueous base is added to the medium at a temperature of 50 to 100° C.

19. The process of claim 18, further comprising combining the isolated pigment with a substrate in order to pigment the substrate.

20. The process of claim 15, further comprising combining the isolated pigment with a substrate in order to pigment the substrate.

21. The process of claim 1, wherein the pigment after said heating has improved coloristic properties as compared to the crude pigment.

\* \* \* \* \*